(12) United States Patent
Jin

(10) Patent No.: US 12,708,076 B2
(45) Date of Patent: Aug. 18, 2026

(54) TREE ROOT MACHINE

(71) Applicant: Yongkang Maxpower Technology Co., Ltd., Yongkang City (CN)

(72) Inventor: Xuancong Jin, Yongkang City (CN)

(73) Assignee: Yongkang Maxpower Technology Co., Ltd., Yongkang City (CN)

( * ) Notice: Subject to any disclaimer, the term of this patent is extended or adjusted under 35 U.S.C. 154(b) by 279 days.

(21) Appl. No.: 18/659,316

(22) Filed: May 9, 2024

(65) Prior Publication Data

US 2025/0248347 A1 Aug. 7, 2025

(30) Foreign Application Priority Data

Feb. 4, 2024 (CN) ......................... 202420270875.2

(51) Int. Cl.
*A01G 23/06* (2006.01)

(52) U.S. Cl.
CPC .................................. *A01G 23/067* (2013.01)

(58) Field of Classification Search
CPC .............................. A01G 23/06; A01G 23/067
See application file for complete search history.

(56) References Cited

U.S. PATENT DOCUMENTS

| | | | | | |
|---|---|---|---|---|---|
| 3,485,314 | A * | 12/1969 | Herr | B60P 9/00 | 280/415.1 |
| 4,402,352 | A * | 9/1983 | Hodges | A01G 23/067 | 37/302 |
| 4,703,786 | A * | 11/1987 | Doskocil | A01G 23/067 | 144/24.12 |
| 2009/0036271 | A1 * | 2/2009 | Brand | A01G 23/06 | 477/181 |
| 2019/0110410 | A1 * | 4/2019 | Carmen, Jr. | A01G 23/067 | |

* cited by examiner

*Primary Examiner* — Bobby Yeonjin Kim
(74) *Attorney, Agent, or Firm* — Bay State IP, LLC

(57) ABSTRACT

The present disclosure provides a novel tree root machine, which includes a machine frame with a push handle, and driven walking wheels and a driving wheel which are rotatably connected to the machine frame. A driving device in transmission connection with the driving wheel is arranged on the machine frame for driving the driving wheel to rotate. The ground contact surface of the driving wheel and the ground contact surfaces of the driven walking wheels are not coplanar, and the position of the driving wheel is higher than that of the driven walking wheel when the push handle is in a raised state. The driving wheel and the driven walking wheels touch the ground together when the push handle is in a lowered state, and then the machine frame is driven to move.

8 Claims, 4 Drawing Sheets

TREE ROOT MACHINE

CROSS REFERENCE TO RELATED APPLICATION

This application claims the benefit of and takes priority from Chinese Patent Application No. 202420270875.2 filed on Feb. 4, 2024, the contents of which are herein incorporated by reference.

TECHNICAL FIELD

The present disclosure relates to the technical field of agricultural equipment, in particular to a novel tree root machine.

BACKGROUND

At present, for tree stumps and tree roots remaining after logging or lodging, the tree root machine is often used for crushing and excavating the tree stumps.

In the prior art, the tree root machine refers to the large-scale automatic walking tree root machine and the manual hand-propelled tree root machine. The large-scale automatic walking tree root machine is relatively large in size. The manual hand-propelled tree root machine is relatively small and more flexible to use, and has more advantages especially for the narrow operation space.

The applicant found that there are at least the following technical problems in the prior art. Manual hand-propelled tree root machine completely relies on manual pushing to walk, and the tree root machine is pushed by users to walk for a long time, so that the labor intensity is high, and the work efficiency is affected.

SUMMARY

The present disclosure aims to provide a novel tree root machine so as to solve the technical problem in the prior art that the hand-propelled tree root machine completely relies on manual pushing to walk and high in labor intensity of users. Various technical effects generated by a preferred technical scheme in various technical schemes provided by the present disclosure are explained in detail as follow.

To achieve the above purpose, the present disclosure adopts the following technical scheme.

The novel tree root machine in the present disclosure includes a machine frame with a push handle, and driven walking wheels and a driving wheel which are rotatably connected to the machine frame.

A driving device in transmission connection with the driving wheel is arranged on the machine frame for driving the driving wheel to rotate.

The ground contact surface of the driving wheel and the ground contact surfaces of the driven walking wheels are not coplanar, and the position of the driving wheel is higher than that of the driven walking wheel when the push handle is in a raised state, the driving wheel and the driven walking wheels touch the ground together when the push handle is in a lowered state, and then the machine frame is driven to move.

Preferably, the number of the driven walking wheels is at least two, and the driven walking wheels are located at one side, away from the push handle, of the driving wheel.

when the number of the driven walking wheels is two, the driving wheels and the driven walking wheels are arranged in a triangular structure.

Preferably, the driving device and the driving wheel are driven by a chain or a belt.

Preferably, the tree root machine includes a storage battery, the storage battery is electrically connected with a gasoline engine and the driving device of the tree root machine, and the storage battery is used for supplying power to the driving device.

Preferably, the tree root machine also includes a gasoline engine, a shaft lever and cutter heads, the shaft lever is rotatably connected to the machine frame, the cutter heads are fixed on the shaft lever, and the gasoline engine is used for driving the shaft lever to rotate.

Preferably, the number of the cutter heads is one or more than two, and when the number of the cutter heads is more than two, the cutter heads are arranged at intervals along the length direction of the shaft lever.

Preferably, the tree root machine also includes a support leg, the support leg is rotatably connected with the machine frame, and when the support leg is supported on the ground, spacing is formed between the cutter head and the ground.

Preferably, the tree root machine also includes an elastic reset piece, one end of the elastic reset piece is connected to the machine frame, the other end of the elastic reset piece is connected to the support leg, and when the support leg is supported on the ground, the elastic reset piece is in a stretching state.

Preferably, the machine frame is also provided with a baffle plate, and the baffle plate is located at the side of the cutter heads.

Preferably, the machine frame is also provided with a protective cover, and the protective cover is arranged outside the cutter heads.

Compared with the prior art, the tree root machine provided by the present embodiment has the following beneficial effects. Both the driven walking wheels and the driving wheel are arranged on the machine frame of the tree root machine. When the tree root machine is lifted by the push handle to crush the tree stump, the driving wheel is higher than the driven walking wheel and leaves the ground. The driven walking wheels are pushed by the user with hands to walk, and the driving wheel does not affect the cutter heads of the tree root machine to crush the tree stump. When the tree root machine does not carry out crushing work and needs to go to other places, the handle is lowered, and the driving wheel and the driven walking wheels can land together. At this time, the driving wheel drives the tree root machine to walk, and the driven walking wheels rotate to assist manpower, so that the labor intensity of users is reduced. When the tree root machine needs to change directions, the handle can be lifted, and the driving wheel leaves the ground, so that the tree root machine is pushed with manpower to change directions conveniently.

According to the novel tree root machine, the walking of the tree root machine can be realized through the combination of manpower and the driving device, so that the labor intensity of users is reduced to a certain extent, and the novel tree root machine is flexible and convenient to use.

BRIEF DESCRIPTION OF THE DRAWINGS

In order to illustrate the technical scheme in the embodiment of the present disclosure or in the prior art more clearly, the attached figures needing to be used in the embodiment or in the description in the prior art are simply described. Apparently, the embodiments in the following description are merely a part rather than all of the embodiments of the present disclosure. For any person skilled in the art, under the premise of without contributing creative labor, other attached figures further can be obtained according to these attached figures.

Figure 1:
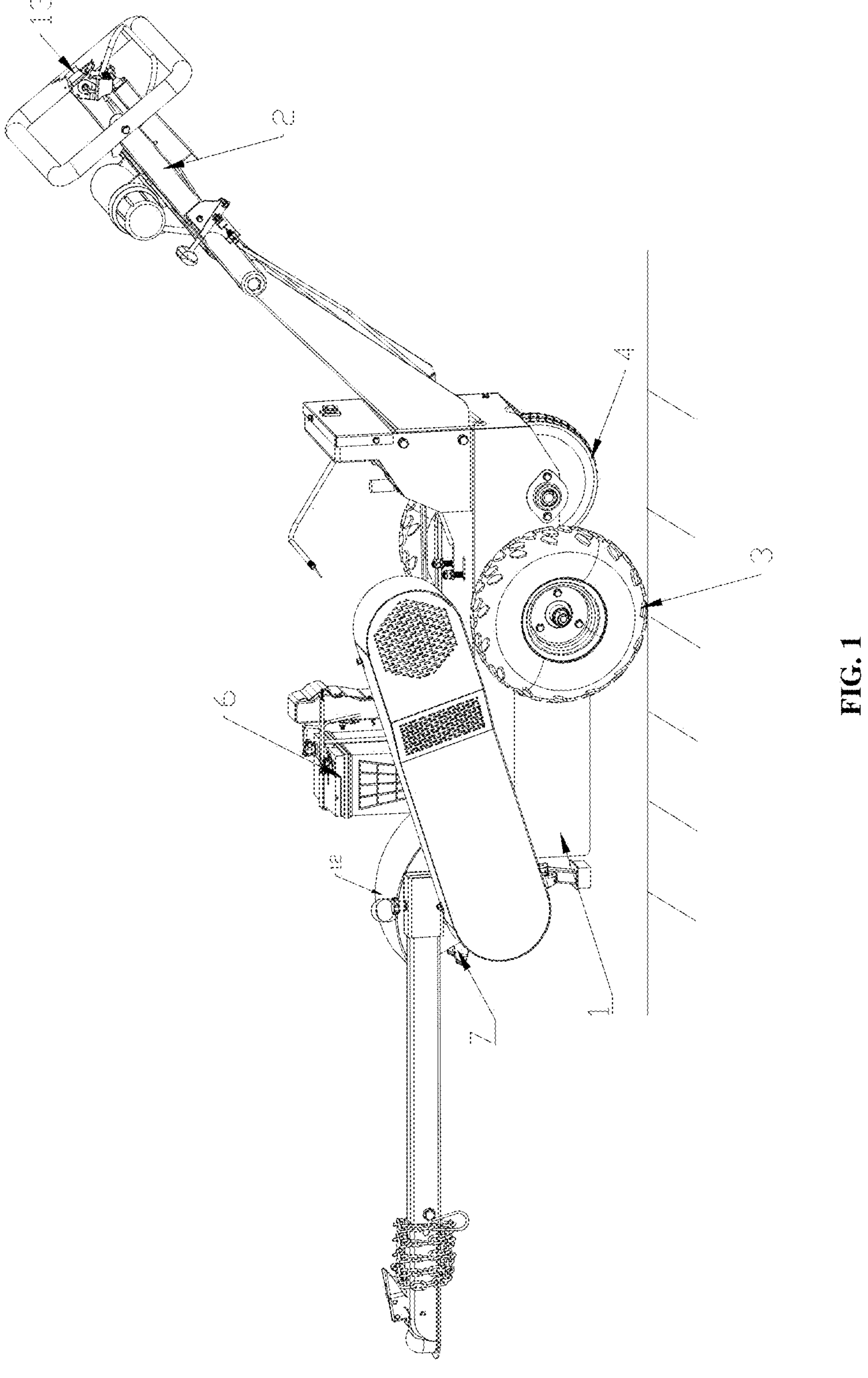
FIG. 1 is a structural schematic diagram when a novel tree root machine is in a raised state.

Reference signs: 1, machine frame; 2, push handle; 3, driven walking wheel; 4, driving wheel; 51, driving sprocket; 52, driven sprocket; 6, gasoline engine; 7, cutter head; 8, support leg; 9, elastic reset piece; 10, rotating shaft; 11, baffle plate; 12, protective cover; and 13, switch.

DETAILED DESCRIPTION OF THE EMBODIMENTS

In order to make the purpose, technical scheme and advantages of the present disclosure more clear, the technical scheme of the present disclosure is described in detail as follows. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

In the description of the present disclosure, it needs to be illustrated that the indicative direction or position relations of the terms such as "center", "length", "width", "upper", "lower", "front", "rear", "left", "right", "vertical", "horizontal", "top", "bottom", "inside", "outside" and "side" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. In the descriptions of the embodiments of the present disclosure, "plurality" means at least two, unless otherwise specified.

In the description of the present disclosure, it needs to be illustrated that, except as otherwise noted, the terms such as "arrange", "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For any person skilled in the art, the specific meanings of the terms in the present disclosure can be understood according to specific conditions.

In the prior art, the tree root machine refers to the large-scale automatic walking tree root machine and the manual hand-propelled tree root machine. The large-scale automatic walking tree root machine is relatively large in size. The manual hand-propelled tree root machine is relatively small and more flexible to use, and has more advantages especially for the narrow operation space. The manual hand-propelled tree root machine completely relies on manual pushing to walk, and the tree root machine is pushed by users to walk for a long time, so that the labor intensity is high, and the work efficiency is affected.

Aiming at the above problems, the present disclosure provides a novel tree root machine. The walking of the tree root machine can be realized through the combination of manpower and the driving device, so that the labor intensity of users is reduced to a certain extent, and the novel tree root machine is flexible and convenient to use.

The technical schemes provided by the present disclosure are described in detail with reference to FIG. 1 to FIG. 4.

Embodiment I

The novel tree root machine provided by the present disclosure includes a machine frame 1 with a push handle 2, and driven walking wheels 3 and a driving wheel 4 which are rotatably connected to the machine frame 1. A driving device in transmission connection with the driving wheel 4 is arranged on the machine frame 1 for driving the driving wheel 4 to rotate. The ground contact surface of the driving wheel 4 and the ground contact surfaces of the driven walking wheels 3 are not coplanar, and the position of the driving wheel 4 is higher than that of the driven walking wheel 3 when the push handle 2 is in a raised state. The driving wheel 4 and the driven walking wheels 3 touch the ground together when the push handle 2 is in a lowered state, and then the machine frame 1 is driven to move.

Wherein, the push handle 2 is used for manual hand holding. When the position of the driving wheel 4 is higher than that of the driven walking wheel 3 when the push handle 2 is in a lifting state, the user can push the push handle 2 by hands, and then the tree root machine is moved.

FIG. 1 is a state schematic diagram when the push handle 2 is lifted by the user and the driving wheel 4 is higher than the driven walking wheel 3 and leaves the ground. When the push handle 2 is lowered by the user, the rear part of the machine frame 1 is lowered, the driving wheel 4 and the driven walking wheel 3 land together, and the driving wheel 4 drives the machine frame 1 to move, so that the labor intensity of the user is reduced.

According to the tree root machine in the present embodiment, both the driven walking wheels 3 and the driving wheel 4 are arranged on the machine frame 1 of the tree root machine. When the tree root machine is lifted by the push handle 2 to crush a tree stump, the driving wheel 4 is higher than the driven walking wheel 3 and leaves the ground. The driven walking wheel 3 are pushed by the user with hands to walk, and the driving wheel 4 does not affect the cutter heads 7 of the tree root machine to crush the tree stump.

When the tree root machine does not carry out crushing work and needs to go to other places, the handle is lowered, and the driving wheel 4 and the driven walking wheels 3 can land together. At this time, the driving wheel 4 drives the tree root machine to walk, and the driven walking wheels 3 rotate to assist manpower, so that the labor intensity of users is reduced.

When the tree root machine needs to change directions, the handle can be lifted, and the driving wheel 4 leaves the ground, so that the tree root machine is pushed with manpower to change directions conveniently.

Figure 2:
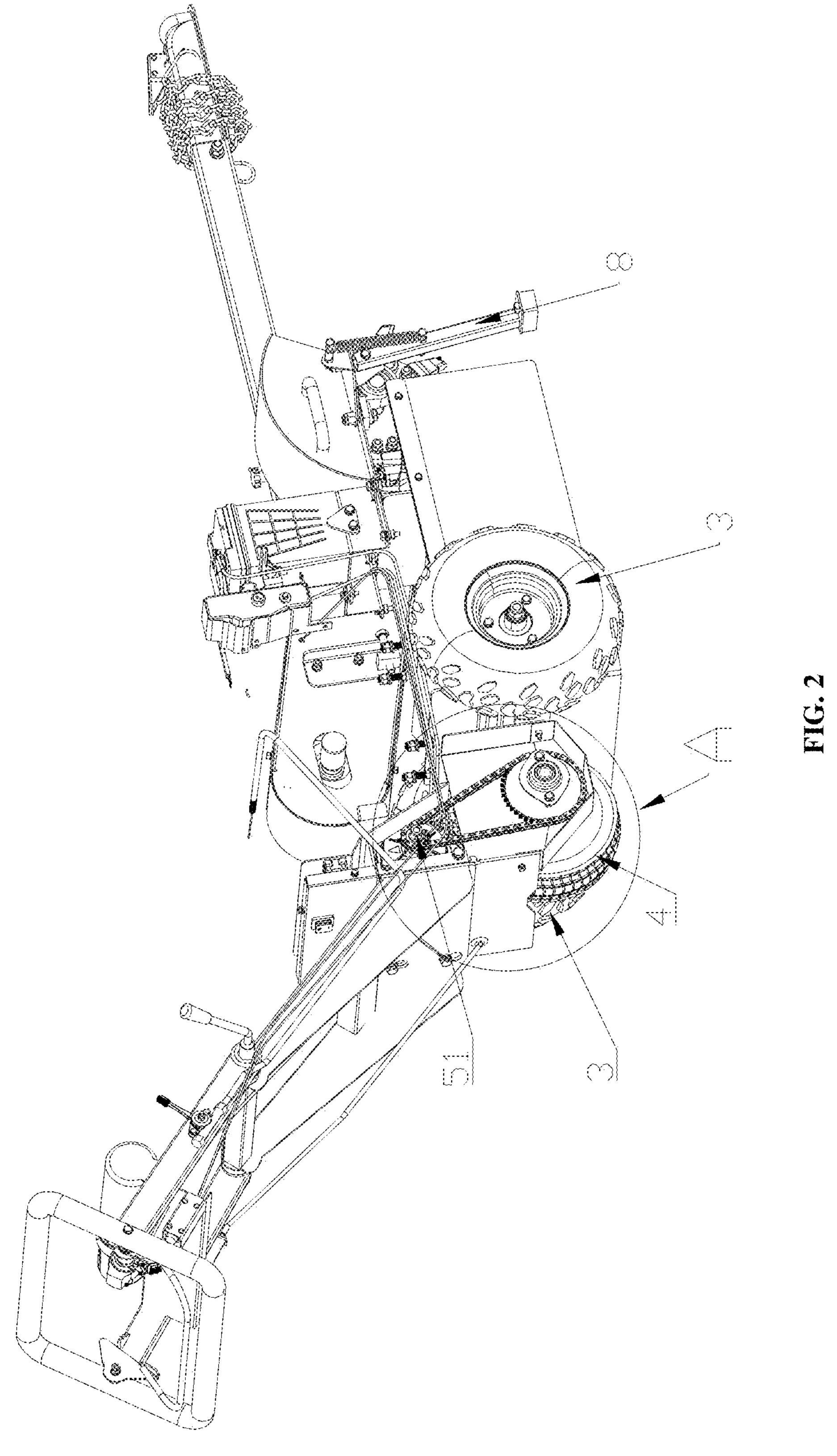
FIG. 2 is a structural schematic diagram of a novel tree root machine in another angle of view.

As an optional embodiment, as shown in FIG. 1 and FIG. 2, the number of the driven walking wheels 3 is at least two, and the driven walking wheels 3 are located on one side, away from the push handle 2, of the driving wheel 4. In the present embodiment, the number of the driven walking wheels 3 is two, and the driving wheel 4 and the driven walking wheels 3 are arranged in a triangular structure.

That is, the two driven walking wheels 3 and the driving wheel 4 are respectively positioned at the three end points of the regular triangle, so that the stability can be improved. When the driving wheel 4 and the driven walking wheels 3 land together, the driving wheel 4 can drive the tree root machine to move stably.

Figure 3:
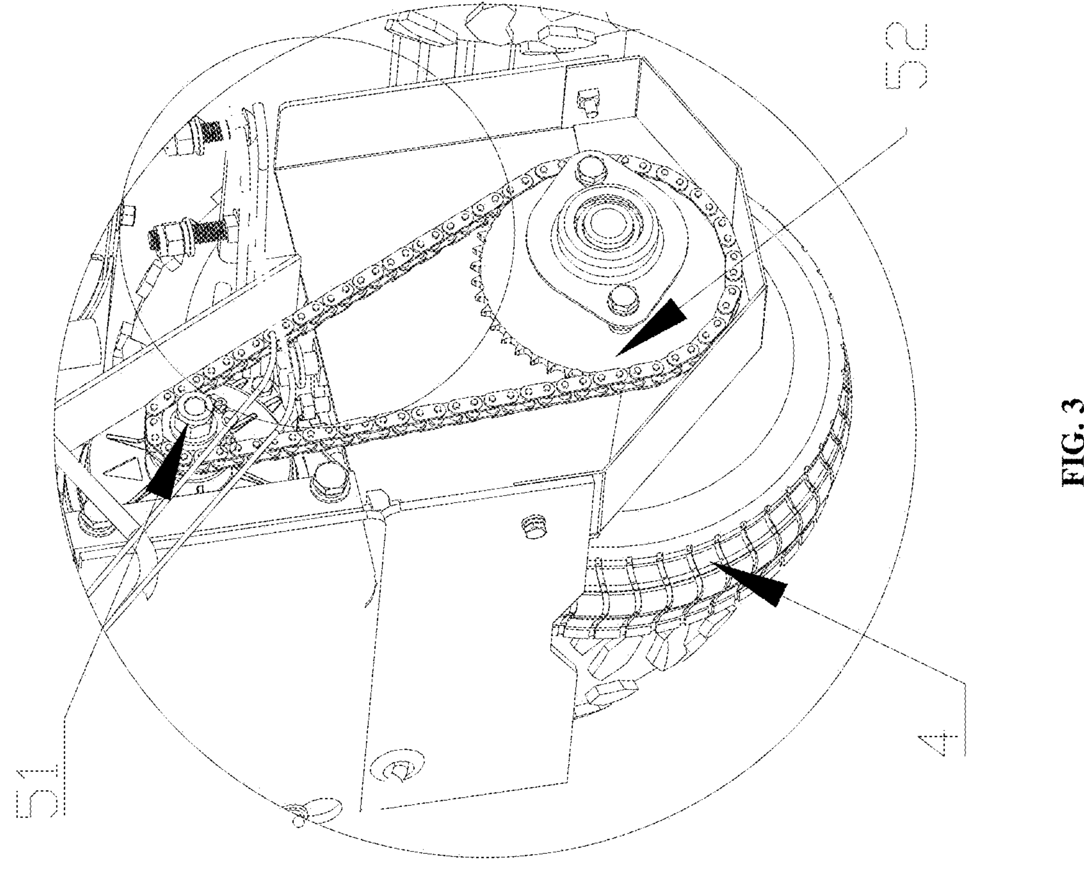
FIG. 3 is a partial enlarged drawing at the position of A in FIG. 2.

As an optional embodiment, as shown in FIG. 2 and FIG. 3, the driving device and the driving wheel 4 are driven by a chain or a belt. Specifically, the driving device can be a brushless motor. As shown in FIG. 3, the output end of the brushless motor is connected with a driving sprocket 51, and the driving wheel 4 is connected with a driven sprocket 52. The driving sprocket 51 and the driven sprocket 52 are driven by a chain. When the brushless motor works, the driving wheel 4 can rotate.

The tree root machine in the prior art includes cutter heads, and the cutter heads are driven by a gasoline engine on the tree root machine.

Power can be supplied to the driving device in the present embodiment by an external power supply alone, or as an optional embodiment, the tree root machine in the present embodiment includes a storage battery. The storage battery is electrically connected with a gasoline engine 6 and the driving device of the tree root machine, and the storage battery is used for supplying power to the driving device.

In the present embodiment, the storage battery is charged by a power generation coil when the gasoline engine 6 is running (that refers to the existing mature technology), and the storage battery supplies power to the driving device (brushless motor), so that the normal operation of the driving device (brushless motor) is ensured, and then the stable operation of the driving wheel 4 is guaranteed.

As shown in FIG. 1, an upper end of the push handle 2 is provided with a switch 13, and the switch 13 is electrically connected with the driving device for controlling the driving device to be switched on or off. It is convenient for the user to control the driving device and the driving wheel 4 to be switched on or off when holding the push handle 2, so that the operation is convenient.

Figure 4:
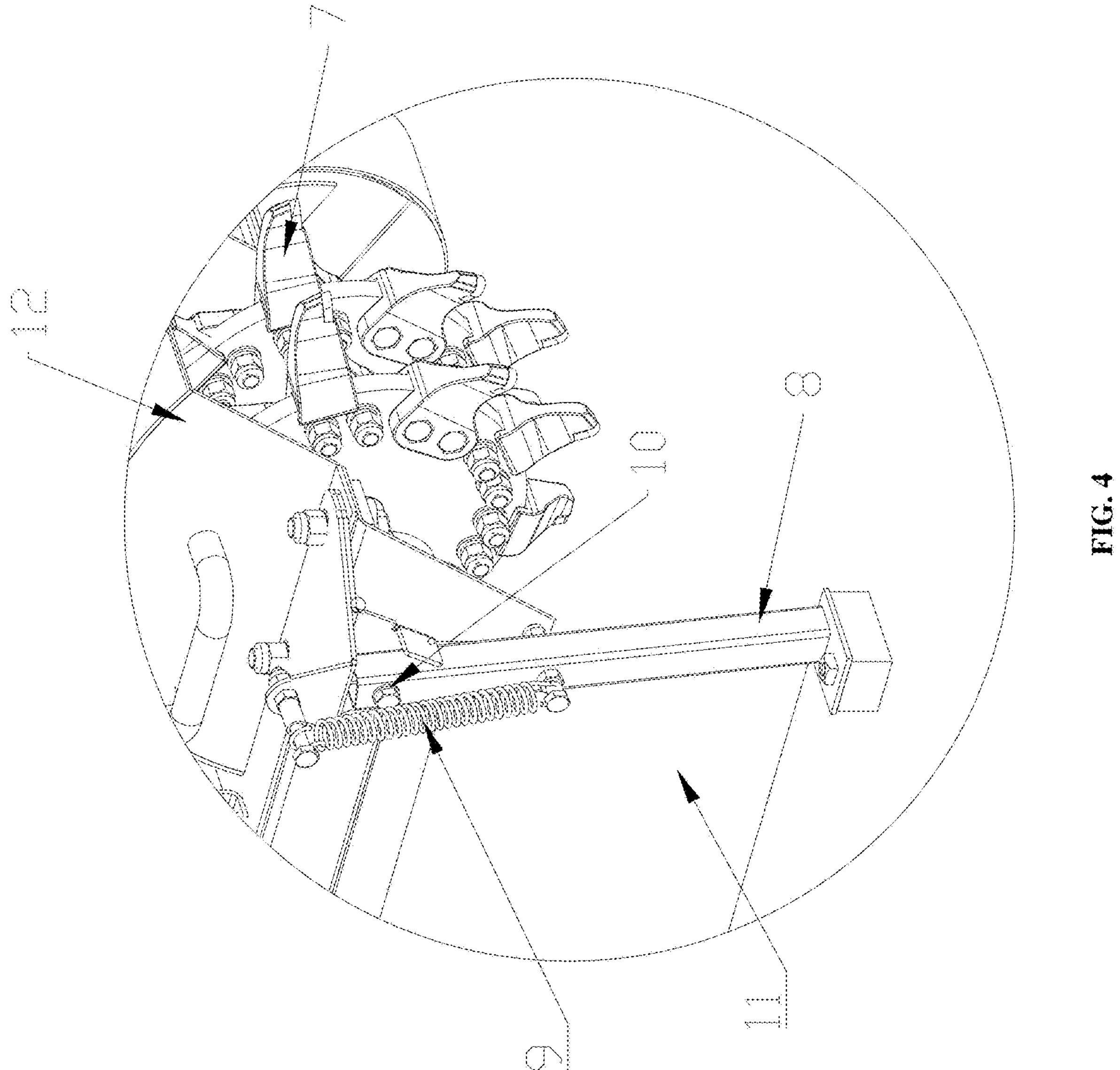
FIG. 4 is a structural schematic diagram at the positions of cutter heads and a support leg.

As an optional embodiment, as shown in FIG. 1 and FIG. 4, the tree root machine also includes a shaft lever (unshown) and cutter heads 7. The shaft lever is rotatably connected to the machine frame 1, the cutter heads 7 are fixed to the shaft lever, and the gasoline engine 6 is used for driving the shaft lever to rotate. As shown in FIG. 4, in the present embodiment, the number of the cutter heads 7 on the same shaft lever is more than two (the number of the cutter heads 7 in FIG. 4 is two, but is not limited to this number), and the cutter heads 7 are arranged at intervals along the longitudinal direction of the shaft lever.

Wherein, the shaft lever is driven by the gasoline engine 6 to rotate in the existing mature technology, and the above structure is provided with more than two cutter heads 7, so that the efficiency of crushing the tree stump can be greatly improved.

At the beginning of starting the cutter heads 7, if the cutter heads 7 touch the ground, there is a problem that the cutter heads 7 are difficult to start and easy to damage.

To solve the above problem, as shown in FIG. 1 and FIG. 4, the tree root machine also includes a support leg 8, and the support leg is rotatably connected with the machine frame 1. Specifically, as shown in FIG. 4, the support leg 8 is rotatably connected with the machine frame 1 through a rotating shaft 1010. When the support leg 8 is supported on the ground, spacing is formed between the cutter head 7 and the ground.

When that cutter heads 7 do not work or before the cutter heads 7 are started, the support leg 8 is supported on the ground, and the cutter heads 7 are located at the position above the round, so that the cutter heads 7 are prevented from starting difficultly, and the cutter heads 7 are started smoothly.

As an optional embodiment, as shown in FIG. 4, the tree root machine also includes an elastic reset piece 9. One end of the elastic reset piece 9 is connected to the machine frame 1, and the other end of the elastic reset piece 9 is connected to the support leg 8. When the support leg 8 is supported on the ground, the elastic reset piece 9 is in a stretching state.

The elastic reset piece 9 can be a tension spring. Specifically, the elastic reset piece 9 can be connected to the machine frame 1 and the support leg 8 through bolt and nut assemblies.

When the cutter heads 7 are located above the ground, the support leg 8 is rotated and supported on the ground. When the cutter heads 7 needs to carry out crushing work, the support leg 8 rotates with the rotating shaft 10 as an axis, the support leg 8 is no longer supported on the ground, and the cutter heads 7 can make contact with the tree stump.

Wherein, "the support leg 8 rotates with the rotating shaft 10 as an axis" specifically refers to that the support leg 8 is held with hands by the user to rotate, or external force is applied to the support leg 8 to rotate with legs.

The elastic reset piece 9 can pull the support leg 8 to rotate by elastic restoring force when the support leg 8 is held with hands by the user to rotate or when external force is applied to the support leg 8 with legs, so that the force exerted by the user is reduced, and the support leg 8 is convenient to use.

As an optional embodiment, as shown in FIG. 4, the machine frame 1 is also provided with a baffle plate 11, and the baffle plate 11 is located at the side of the cutter heads 7. The baffle plate 11 can prevent scraps from splashing from the side to a certain extent when the tree stump is crushed by the cutter heads 7, so that the effect of protecting the user is achieved, and the use safety is improved.

As an optional embodiment, as shown in FIG. 1 and FIG. 4, the machine frame 1 is also provided with a protective cover 12, and the protective cover 12 is arranged outside the cutter heads 7.

The upper part of the cutter heads 7 is covered with the protective cover 12, and the protective cover 12 can prevent scraps from splashing upward to a certain extent when the tree stump is crushed by the cutter heads 7, so that the effect of protecting the user is achieved, and the use safety is improved.

The tree root machine in the present embodiment has three usage situations when in use.

When the tree root machine carries out crushing work on the tree stump, the push handle 2 is lifted, the driving wheel 4 is higher than the driven walking wheel 3 and leaves the ground. The push handle 2 is pushed with hands by the user, and the driven walking wheels 3 rotate under the pushing of manpower, so that the tree root machine crushes the tree stump while moving, and the driving wheel 4 does not affect the crushing work of the cutter heads 7 of the tree root machine.

When the tree root machine does not carry out crushing work and needs to go to other places, the handle is lowered, and the driving wheel 4 and the driven walking wheels 3 can land together. At this time, the driving wheel 4 drives the tree root machine to walk linearly, and the driven walking wheels 3 rotate to assist manpower, so that the labor intensity of users is reduced.

When the tree root machine needs to change directions, the handle can be lifted, and the driving wheel 4 leaves the ground, so that the tree root machine is pushed with manpower to change directions conveniently.

In the description of the present disclosure, the specific features, structures or characteristics can be combined in any of one or more embodiments or examples appropriately.

In the description of the specification, the description of the reference terms such as “one embodiment”, “some embodiments”, “examples”, “specific examples” or “some examples” indicates to be contained in at least one embodiment or example of the present disclosure in combination with specific characteristics, structures, materials or characteristics described by the embodiment or example. In the specification, schematic expression of the above terms does not necessarily refer to the same embodiment or example. Moreover, the described specific features, structures, materials or characteristics can be combined in any one or more embodiments or examples appropriately. In addition, those skilled in the art can integrate and combine different embodiments or examples and features of different embodiments or examples described in this specification without contradicting each other.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A novel tree root machine, comprising a machine frame with a push handle, and driven walking wheels and a driving wheel which are rotatably connected to the machine frame, wherein a driving device in transmission connection with the driving wheel is arranged on the machine frame for driving the driving wheel to rotate; the ground contact surface of the driving wheel and the ground contact surfaces of the driven walking wheels are not coplanar, and the position of the driving wheel is higher than that of the driven walking wheel when the push handle is in a raised state, the driving wheel and the driven walking wheels touch the ground together when the push handle is in a lowered state, and then the machine frame is driven to move; wherein the tree root machine also comprises a gasoline engine, a shaft lever and cutter heads, the shaft lever is rotatably connected to the machine frame, the cutter heads are fixed on the shaft lever, and the gasoline engine is used for driving the shaft lever to rotate; and wherein the tree root machine comprises a storage battery, the storage battery is electrically connected with the gasoline engine and the driving device of the tree root machine, and the storage battery is used for supplying power to the driving device.

2. The novel tree root machine according to claim 1, wherein the number of the driven walking wheels is at least two, and the driven walking wheels are located at one side, away from the push handle, of the driving wheel; and when the number of the driven walking wheels is two, the driving wheels and the driven walking wheels are arranged in a triangular structure.

3. The novel tree root machine according to claim 1, wherein the driving device and the driving wheel are driven by a chain or a belt.

4. The novel tree root machine according to claim 1, wherein the number of the cutter heads is one or more than two, and when the number of the cutter heads is more than two, the cutter heads are arranged at intervals along the length direction of the shaft lever.

5. The novel tree root machine according to claim 1, wherein the tree root machine also comprises a support leg, the support leg is rotatably connected with the machine frame, and when the support leg is supported on the ground, spacing is formed between the cutter head and the ground.

6. The novel tree root machine according to claim 5, wherein the tree root machine also comprises an elastic reset piece, one end of the elastic reset piece is connected to the machine frame, the other end of the elastic reset piece is connected to the support leg, and when the support leg is supported on the ground, the elastic reset piece is in a stretching state.

7. The novel tree root machine according to claim 1, wherein the machine frame is also provided with a baffle plate, and the baffle plate is located at the side of the cutter heads.

8. The novel tree root machine according to claim 1, wherein the machine frame is also provided with a protective cover, and the protective cover is arranged outside the cutter heads.

* * * * *